US007462274B2

(12) United States Patent
Hamid et al.

(10) Patent No.: US 7,462,274 B2
(45) Date of Patent: Dec. 9, 2008

(54) FLUID SEPARATOR WITH SMART SURFACE

(75) Inventors: Syed Hamid, Dallas, TX (US); Beegamudre N. Murali, Houston, TX (US); Harry D. Smith, Jr., Montgomery, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 949 days.

(21) Appl. No.: 10/883,368

(22) Filed: Jul. 1, 2004

(65) Prior Publication Data

US 2006/0000762 A1 Jan. 5, 2006

(51) Int. Cl.
*C02F 1/461* (2006.01)

(52) U.S. Cl. ....................... 205/687; 205/688; 204/563; 204/570

(58) Field of Classification Search ................. 205/687, 205/688; 204/563, 570
See application file for complete search history.

(56) References Cited

U.S. PATENT DOCUMENTS

| | | | |
|---|---|---|---|
| 4,241,787 A | | 12/1980 | Price |
| 4,296,810 A | | 10/1981 | Price |
| 4,377,623 A | * | 3/1983 | Parker et al. .................. 429/15 |
| 5,127,457 A | | 7/1992 | Stewart et al. |
| 5,149,432 A | | 9/1992 | Lavin |
| 5,156,586 A | | 10/1992 | Fitch, Jr. et al. |
| 5,195,939 A | | 3/1993 | Gingras |
| 5,240,073 A | | 8/1993 | Bustamante et al. |
| 5,296,153 A | | 3/1994 | Peachey |
| 5,370,000 A | | 12/1994 | Herwig et al. |
| 5,370,600 A | | 12/1994 | Fitch, Jr. et al. |
| 5,389,128 A | | 2/1995 | Lopes |
| 5,425,416 A | | 6/1995 | Hammeke et al. |
| 5,431,228 A | | 7/1995 | Weingarten et al. |
| 5,443,120 A | | 8/1995 | Howell |
| 5,456,837 A | | 10/1995 | Peachey |
| 5,484,383 A | | 1/1996 | Fitch, Jr. et al. |
| 5,565,078 A | | 10/1996 | Sams et al. |

(Continued)

FOREIGN PATENT DOCUMENTS

EP 0834342 B1 2/2003

(Continued)

OTHER PUBLICATIONS

C.C. Jensen A/S, Lovholmen 13, 5700 Svendborg, Denmark, "*CJC™ Filter Separator*," 2 pages <http://www.cjc.dk/index.php?m=p&pid=34>, visited Sep. 27, 2004.

(Continued)

*Primary Examiner*—Arun S Phasge
(74) *Attorney, Agent, or Firm*—Josh Griswold

(57) ABSTRACT

A separating system for separating a fluid mixture incorporates a smart surface having reversibly switchable properties. A voltage is selectively applied to the smart surface to attract or repel constituents of a fluid mixture, such as oil and water produced from a hydrocarbon well. The smart surface can be used in a conditioner to increase droplet size prior to entering a conventional separator, or the smart surface and other elements of the invention can be incorporated into an otherwise conventional separator to enhance separation. In a related aspect, a concentration sensor incorporating smart surfaces senses concentration of the fluid mixture's constituents.

12 Claims, 10 Drawing Sheets

U.S. PATENT DOCUMENTS

| | | | |
|---|---|---|---|
| 5,570,744 | A | 11/1996 | Weingarten et al. |
| 5,730,871 | A | 3/1998 | Kennedy et al. |
| 5,857,519 | A | 1/1999 | Bowlin et al. |
| 5,899,270 | A | 5/1999 | Watson |
| 5,916,082 | A | 6/1999 | Opfer |
| 5,961,841 | A | 10/1999 | Bowers |
| 5,988,275 | A | 11/1999 | Brady et al. |
| 5,992,521 | A | 11/1999 | Bergren et al. |
| 5,996,690 | A | 12/1999 | Shaw et al. |
| 6,015,011 | A | 1/2000 | Hunter |
| 6,017,456 | A | 1/2000 | Kennedy et al. |
| 6,033,567 | A | 3/2000 | Lee et al. |
| 6,056,054 | A | 5/2000 | Brady et al. |
| 6,068,053 | A | 5/2000 | Shaw |
| 6,080,312 | A | 6/2000 | Bowers et al. |
| 6,082,452 | A | 7/2000 | Shaw et al. |
| 6,089,317 | A | 7/2000 | Shaw |
| 6,119,870 | A | 9/2000 | Maciejewski et al. |
| 6,131,655 | A | 10/2000 | Shaw |
| 6,138,757 | A | 10/2000 | Latos et al. |
| 6,138,758 | A | 10/2000 | Shaw et al. |
| 6,142,224 | A | 11/2000 | Stuebinger et al. |
| 6,152,218 | A | 11/2000 | Safargar |
| 6,173,768 | B1 | 1/2001 | Watson |
| 6,173,774 | B1 | 1/2001 | Fox |
| 6,189,613 | B1 | 2/2001 | Chachula et al. |
| 6,196,312 | B1 | 3/2001 | Collins et al. |
| 6,196,313 | B1 | 3/2001 | Simons |
| 6,202,744 | B1 | 3/2001 | Shaw |
| 6,209,641 | B1 | 4/2001 | Stevenson |
| 6,234,258 | B1 | 5/2001 | Karigan |
| 6,260,619 | B1 | 7/2001 | Svedeman et al. |
| 6,328,118 | B1 | 12/2001 | Karigan et al. |
| 6,336,503 | B1 | 1/2002 | Alhanati et al. |
| 6,336,504 | B1 | 1/2002 | Alhanati et al. |
| 6,357,530 | B1 | 3/2002 | Kennedy et al. |
| 6,367,547 | B1 | 4/2002 | Towers et al. |
| 6,382,316 | B1 | 5/2002 | Kintzele |
| 6,436,298 | B1 | 8/2002 | Parkinson |
| 6,494,258 | B1 | 12/2002 | Weingarten |
| 6,543,537 | B1 | 4/2003 | Kjos |
| 6,547,003 | B1 | 4/2003 | Bangash et al. |
| 6,550,535 | B1 | 4/2003 | Traylor |
| 6,554,068 | B1 | 4/2003 | Chatterji et al. |
| 6,627,081 | B1 | 9/2003 | Hilditch et al. |
| 6,672,385 | B2 | 1/2004 | Kilaas et al. |
| 6,691,781 | B2 | 2/2004 | Almdahl et al. |
| 6,705,402 | B2 | 3/2004 | Proctor |
| 6,719,048 | B1 | 4/2004 | Ramos et al. |
| 6,736,880 | B2 | 5/2004 | Ford et al. |
| 6,755,250 | B2 | 6/2004 | Hall et al. |
| 6,755,251 | B2 | 6/2004 | Thomas et al. |
| 6,755,978 | B2 | 6/2004 | Oddie |
| 6,761,215 | B2 | 7/2004 | Morrison et al. |
| 6,868,907 | B2 | 3/2005 | Homstvedt et al. |
| 6,868,911 | B1 | 3/2005 | Jacobson et al. |
| 2002/0084073 | A1 | 7/2002 | Underdown et al. |
| 2002/0189807 | A1 | 12/2002 | Emanuele et al. |
| 2003/0051874 | A1 | 3/2003 | Munson et al. |
| 2003/0079876 | A1 | 5/2003 | Underdown |
| 2003/0145991 | A1 | 8/2003 | Olsen |
| 2004/0069494 | A1 | 4/2004 | Olsen et al. |
| 2004/0074390 | A1 | 4/2004 | Ford et al. |
| 2004/0104027 | A1 | 6/2004 | Rossi et al. |
| 2004/0112602 | A1 | 6/2004 | Arebrat |
| 2004/0134654 | A1 | 7/2004 | Snow |

FOREIGN PATENT DOCUMENTS

| | | | |
|---|---|---|---|
| GB | 2 395 504 | | 5/2004 |
| WO | WO 92/00810 | | 1/1992 |
| WO | WO 9603566 | A2 | 2/1996 |
| WO | WO 9725150 | A1 | 7/1997 |
| WO | WO 9837307 | A1 | 8/1998 |
| WO | WO9841304 | | 9/1998 |
| WO | WO 0065197 | A1 | 11/2000 |
| WO | WO 0123707 | A1 | 4/2001 |
| WO | WO 0131328 | A1 | 5/2001 |
| WO | WO 0214647 | A1 | 2/2002 |
| WO | WO 03/022409 | A1 | 3/2003 |
| WO | WO 2003062597 | A1 | 7/2003 |
| WO | WO 2004/053291 | A1 | 6/2004 |

OTHER PUBLICATIONS

Aker Kvaerner, "*Top Seperator*," 1 page <http://www.akerkvaener.com/Internet/IndustriesAndServices/Pulping/Fiberlinerecaust/Co>, visited Sep. 13, 2004.

Aker Kvaerner, "*Kvaerner Process Systems—Process Systems And Complete Process Trains For The Oil And Gas Industry*," 3 pages <http://www.offshore-technology.com/contractors/separation/kvaerner3/>, visited Sep. 13, 2004.

looksmart, "*Downhole Separation Eliminates Premature Oil Well Shut-Ins*, " *World Oil*, Apr. 1998, 3 pages http://www.finarticles.com/p/articles/mi_m3159/is_n4_219/ai_20872448, visited Sep. 13, 2004.

Gibbs, Walter, "*A Cleaner, Brighter Oil Age*," May 2, 2002, 5 pages http://www.nortrade.com/OilGas/Articles/ShowArticle.aspx?id=27&sctorid=25>, visited Sep. 13, 2004.

Nilsen, Pål, et al, "*A Novel Separator Inlet Design*," 1999, 1 pg http://www01.se.abb.com/global/gad/gad00393.nsf/0/8a9875a54720er79c1256ccc0048747>, site visited Sep. 13, 2004.

Stewart Technology Associates, *Overview of STA*, "Recent Installation—Zetapdm," 3 pages <htpp://www.stewart-usa.com/id73_m.htm>, visited Sep. 13, 2004.

Hart's E&Pnet, "*March: Subsea Processing: Seabed Processing Comes of Age*," Mar. 2000, 5 pages, <http://www.eandpnet.com/ep/previous/0300/seabed.htm>, visited Sep. 13, 2004.

Technology Applications, Mar. 2000, 2 pgs.

Jotne Link, "*Spearators From Jotne to Grane*", 2000, 1 pg. http://www/jotne.com/jotnelink/sept00/separators.html>, visited Sep. 13, 2004.

Affleck, Richard Peter, "*Recovery of Xylitol From Fermentation of Model Hemicellulose Hydrolysates Using Membrame Technology*," Dec. 12, 2000, Blacksburg, Virginia, 118 pgs.

Eurolakes, *Integrated Water Resource Management for Improtant Deep European Lakes and Their Catchment Areas*, "D-15: Technical Considerations part 3—EUROSKIM," Feb. 25, 2002, 59 pgs.

NCSRT, "*OPTISEP 200 & 400 Biopharmaceutical Processing, Flat Sheet Membrane Holder*," 2 pages <http://www.ncsrt.com/web_development/web_site/filt_optisep.htm,>, site visited Sep. 13, 2004.

LeCoffre, Yves, et al, "*Optisep®, A new concept in liquid-liquid separation*, " Force Downhole Subsea Processing Seminar, Mar. 16-17, 1999, Stabanger, YLec Consultants, 19 pgs.

Dougherty, Cynthia C., Memorandum to Water Management Division Directors EPA Regions I-X, "Well *Classification Guidance for Downhole Hydrocarbon/Water Separators*", UIC Program Guidance #82, Jan. 5, 2000, 8 pgs.

Kvaerner, KOP Internet, materials from Website, 4 pages <http://www.kop.kvaerner.com>, visited Mar. 22, 2002.

Wolff, Erik A., et al., "*Advanced Electrostatic Internals in the 1st Stage Separator Enhabce Oil/Water Separation and Reduce Chemical Consumption on the Troll C Platform*," OTC 16321, *Offshore Technology Conference*, Houston, Texas, May 3-Jun. 2004, pp. 1-7.

"*Quantum Leap in Downhole Separation* ," PetroMin, Mar. 2000, pp. 28-31.

Gunnerod, Terje, "*Quantum Leap in Downhole Separation*," prior to Mar. 2000, pp. 7-10.

Verbeek, P.H.J., et al., "*Downhole Separator Produces Less Water and More Oil*," SPE 50617, Society of Petroleum Engineers, Inc., copyright 1998, pp. 429-434.

"*Downhole Separator Produces Less Water and More Oil*," JPT, Mar. 1999, 2 pages.

Schanke, T., et al., "*Oil in Water Monitoring for Subsea and Downhole Separators*," SPE 66538, Society of Petroleum Engineers, Inc., copyright 2001, pp. 1-6.

U.S. Appl. No. 10/692,564 titled, "*Orbital Downhole Separator*," 29 pages specification, claims and abstract and 6 pages of drawings, filed Oct. 24, 2003.

U.S. Appl. No. 10/924,161 titled, "*Downhole Oil and Water Separator and Method*," 1 page Cover, 18 pages specification, claims, and abstract and 6 pages of drawings, filed Aug. 23, 2004.

"*Chemists Concoct Quick-Change Surface*," *Science*, vol. 299, Jan. 17, 2003, pp. 321 and 323.

Huber, Dale L. et al, "*Programmed Adsorption and Release of Proteins in a Microfluidic Device*," *Science*, vol. 301, Jul. 18, 2003, pp. 352-354.

Science Magazine, A Reversibly Switching Surface, Oct. 2003, vol. 299, 371-374.

MIT News, MIT's Smart Surface Reverse Properties, Jan. 2003.

* cited by examiner

FLUID SEPARATOR WITH SMART SURFACE

FIELD OF THE INVENTION

The invention relates to separators for separating components of a fluid mixture. In particular, the invention relates to a separator using smart surfaces to enhance separation of oil and water produced from a downhole formation.

BACKGROUND OF THE INVENTION

A recent innovation in materials science is the development of "smart surfaces" that have reversible properties. In particular, scientists are developing an approach for "dynamically controlling interfacial properties that uses conformational transitions (switching) of surface-confined molecules." (*A Reversible Switching Surface*—Science Magazine, 18 Oct. 2002). As explained further in MIT News (*MIT's Smart surface Reverses Properties*—Jan. 16, 2003), researchers describe "an example of their new approach in which they engineered a surface that can change from water-attracting to water-repelling with the application of a weak electric field. Switch the electrical potential of that field from positive to negative and the surface reverts to its initial affinity for water." The smart surface has a plurality of surface-confined molecules, sufficiently spaced to undergo conformational transitions in response to an applied voltage to preferentially expose hydrophilic or hydrophobic portions of the surface-confined molecules. This is shown diagrammatically in the above articles as a downward, lateral bending of the molecules in response to the applied voltage. The molecules have hydrophilic or "water-loving" tops, exposed in the absence of the applied voltage. When bent down, the molecules expose hydrophobic or "water-repelling" loops. A suggested application of this emerging technology is the manipulation of molecules in fluids, such as the "bioseparation" of one molecule from another.

The oil and gas industry has long been interested in improving ways to "manipulate molecules" and separate fluids. In the production of hydrocarbons from formations, superfluous components such as water are often produced. The oil must be separated from the water and other components before it can be used. Conventional separators typically rely on the difference in densities between oil and water, separating the fluids via gravity or centrifugal force. Centrifugal separators separate the oil and water mixture in a rotating vessel such that the oil segregates inwardly while the water segregates outwardly. Hydrocyclonic separators rotate and separate the fluid mixture without the use of a rotating vessel. Gravity separators separate oil in a static vessel, allowing the lighter oil to segregate upwardly and the higher density water to segregate downwardly. Examples of various separators are discussed in U.S. Pat. Nos. 6,550,535, 6,436,298, 5,916,082, 5,565,078, 5,195,939, and 5,149,432.

Downhole separation in oil wells is increasingly attractive because the separated water can be readily re-injected into a downhole water bearing formation without removing it from the well bore. This obviates the need for surface tanks, separators, and water disposal systems, reducing costs and the possibility of environmental damage. Environmental concerns may simultaneously complicate this approach, however, requiring a relatively high degree of purity of the re-injected water. Using existing separation techniques, the high degree of separation required by regulations and environmentally responsible production of hydrocarbons is generally not attainable. In addition, if significant oil is injected into the disposal zone with the water, the water bearing formation may be adversely affected by the oil, causing blockage and/or reduced permeability of the injection interval.

Another problem with existing separation devices and methods is the amount of energy consumed in the process, and related costs. Although the industry typically generates high revenues from the production of oil and gas, the associated costs are typically on the same order of magnitude. The industry therefore constantly strives to improve efficiency in all areas of production. As a result, efficiency in separation is as important as efficiency in other areas of production.

There is a need for an improved approach to separating oil, water, and other fluids and solids. Whatever can be done to increase the efficiency of existing separation techniques will ultimately benefit not only the oil and gas industry, but society as a whole.

SUMMARY OF THE INVENTION

According to one specific embodiment, a separating system separates constituents of a fluid mixture having different densities, such as water and oil. A conditioning vessel has a fluid inlet and a fluid outlet for passing the fluid mixture through the conditioning vessel. A smart surface within the conditioning fluid vessel has a plurality of surface-confined molecules sufficiently spaced to undergo conformational transitions in response to an applied voltage to preferentially expose hydrophilic or hydrophobic portions of the surface-confined molecules. A voltage source is used to selectively apply a voltage to the smart surface to attract or repel the water in proximity to the smart surface, thereby displacing the oil in proximity to the smart surface away from or toward the smart surface, respectively, thereby "conditioning" the fluid mixture to enhance separation. Conditioning the fluid usually also involves increasing the size of oil droplet or particles within the fluid mixture. A separator including a separator vessel is positioned downstream from the conditioning fluid vessel. The separator may include a conventional fluid separator, such as a gravitational, centrifugal, or hydrocyclonic separator. The separator receives and separates the conditioned fluid mixture and outputs the separated oil from an oil outlet and the separated water from a water outlet. Because the fluid mixture is conditioned prior to entering the separator, separation speed and efficacy are enhanced.

According to another specific embodiment, a fluid separator comprises a separator vessel for containing the fluid mixture. The separator vessel has a fluid inlet for passing fluid mixture into the separator vessel, an oil outlet for passing separated oil out of the separator vessel, and a water outlet for passing separated water out of the separator vessel. A smart surface is positioned within the separator vessel itself (rather than being located in an upstream fluid conditioner). A voltage source selectively applies a voltage to the smart surface to selectively attract or repel the water in proximity to the smart surface, thereby displacing the oil in proximity to the smart surface away from or toward the smart surface, respectively. The separator may include a conventional fluid separator, such as a gravitational, centrifugal, or hydrocyclonic separator.

According to yet another specific embodiment, a concentration sensor senses concentration of a fluid mixture of water and one or more other substances in a vessel containing the fluid mixture. A smart surface is positioned within the vessel. A voltage source is included for selectively applying a voltage to the smart surface. A capacitor probe is included for measuring capacitance at the smart surface. A computer is in communication with the capacitor probe for evaluating changing capacitance at the smart surface. The computer outputs representations of concentration of one or both of the water and the one or more other substances as a function of the measured capacitance. An output device such as a computer monitor may be included to visually indicate fluid concentration. For example, a video display monitor could indicate graphical or numerical representations of concentration. In some embodiments, the concentration sensor is essentially a subsystem of a fluid separating system.

These and further features and advantages of the present invention will become apparent from the following detailed description, wherein reference is made to figures in the accompanying drawings.

DETAILED DESCRIPTION OF THE PREFERRED EMBODIMENTS

Figure 1:
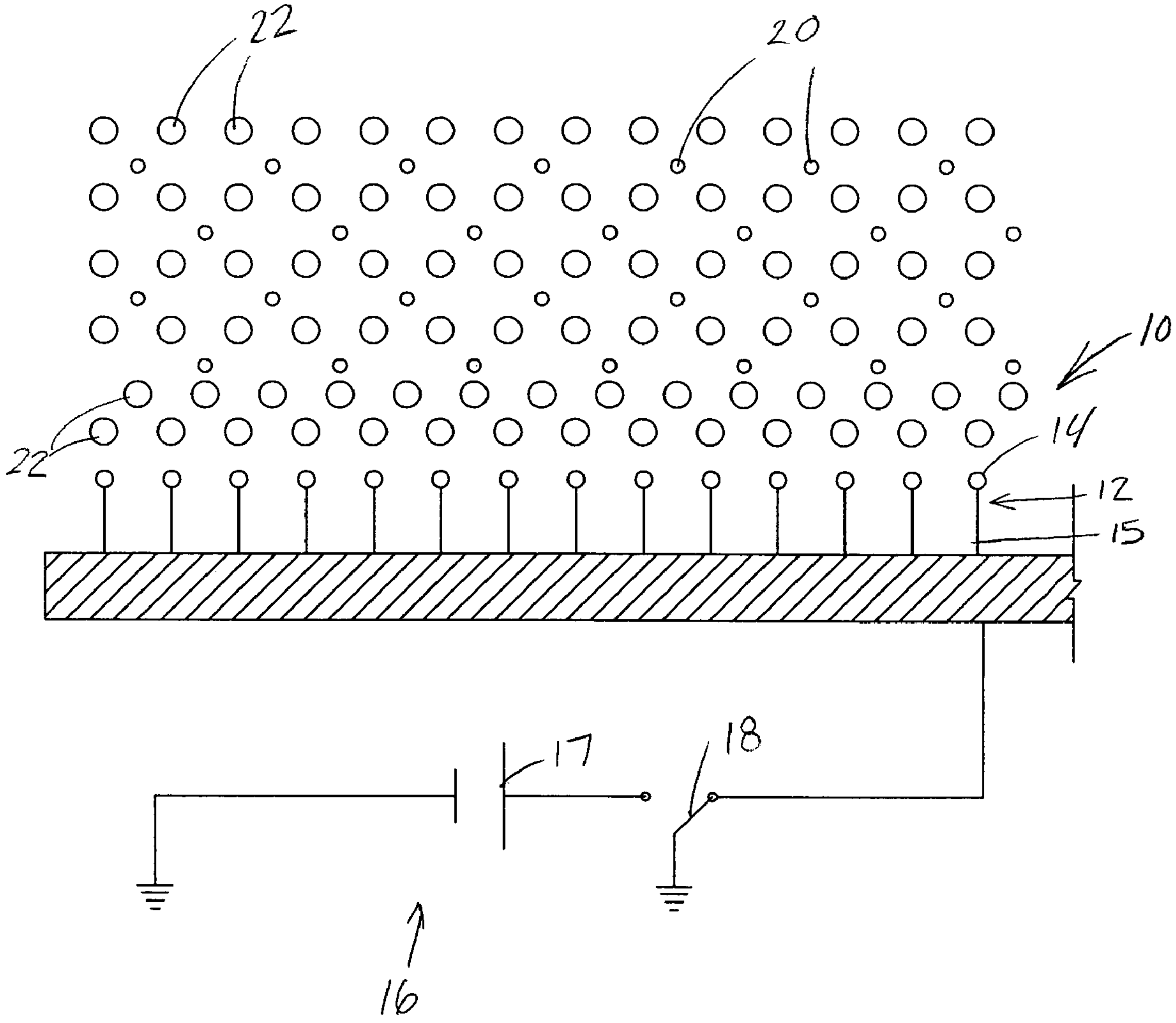
FIG. 1 conceptually illustrates a smart surface having a plurality of surface-confined molecules preferentially exposing hydrophilic portions of the surface-confined molecules.

FIG. 1 conceptually illustrates a smart surface generally indicated at 10, having a plurality of surface-confined molecules 12 preferentially exposing hydrophilic portions 14 of the surface-confined molecules 12. A smart surface may be succinctly defined as a surface "having a plurality of surface-confined molecules sufficiently spaced to undergo conformational transitions in response to an applied voltage to preferentially expose hydrophilic or hydrophobic portions of the surface-confined molecules." The chemistry and engineering involved, including the types of molecules selected and how they are produced and assembled to the smart surface 10, is generally known in this emerging art, and is therefore not discussed herein. A circuit conceptually indicated at 16 includes voltage source 17 and is wired to the smart surface 10. A voltage may be selectively applied to the surface 10 by closing the circuit 16 with gate 18. In FIG. 1, the circuit 16 is open to an "off" position, as represented by open gate 18, so that no voltage is applied to the smart surface 10. A plurality of oil molecules or small oil droplets 20 are shown evenly dispersed with a plurality of water molecules or small water droplets 22, forming a fluid mixture 21. FIG. 1 indicates that the water droplets 22 either have a weak attraction for the hydrophilic portions 14, or the fluid mixture 21 has only briefly been exposed to the smart surface 10, so that the oil and water droplets 20, 22 have not had time to segregate, and remain relatively evenly dispersed.

Figure 2:
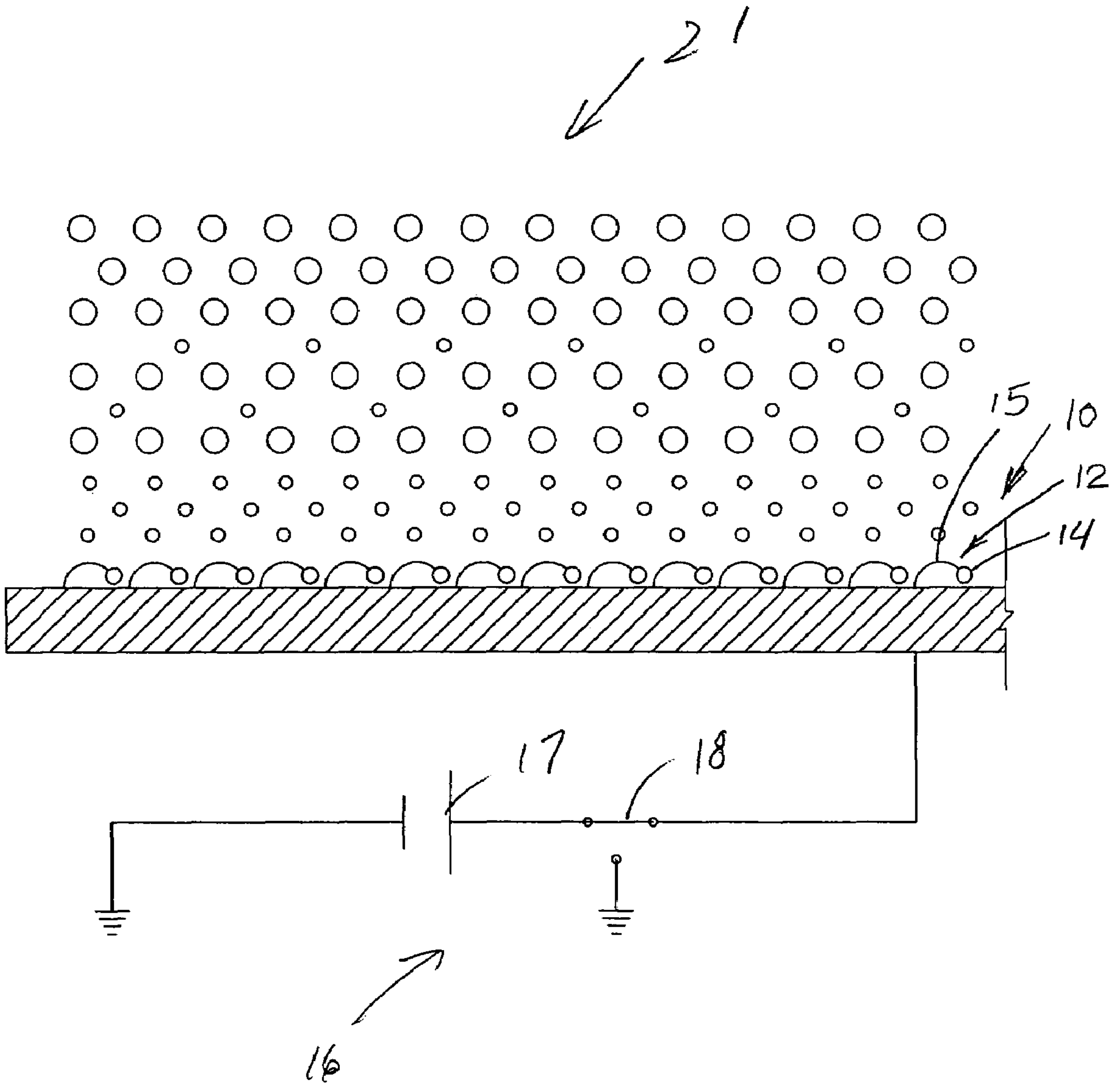
FIG. 2 conceptually illustrates the smart surface under an applied voltage whereby the surface-confined molecules have undergone a conformational transition to expose hydrophobic portions of the surface-confined molecules.

FIG. 2 conceptually illustrates the smart surface 10 under an applied voltage, with the gate 18 closed to an "on" position to complete circuit 16. In response to the applied voltage, the surface-confined molecules 12 have undergone a conformational transition in response to the applied voltage to expose hydrophobic portions 15 of the surface-confined molecules 12. The molecules 12 are sufficiently spaced so they have room to "bend" as shown, and these bends at least conceptually represent the hydrophobic portions 15. The smart surface 10 is thus repelling the water molecules 22, to correspondingly displace oil molecules 20 toward the smart surface 10. The oil and water molecules 20, 22 have begun to segregate, with a greater density of oil molecules 20 distributed near the smart surface 10, and a greater density of water molecules 22 distributed away from the smart surface 10 than would likely occur in a situation with no smart surface present. This segregation is partly a function of both the repellant strength of the hydrophobic portions 15 and the amount of time the fluid mixture 21 has been exposed to the smart surface 10 under the applied voltage.

It is emphasized that the representations of molecules and their behavior and interaction herein are merely conceptual. For instance: neither oil nor water molecules (nor their droplets) are necessarily circular or spherical as depicted; the relative size and proportion of the oil and water molecules 20, 22 is not meant to be literally portrayed; the dispersement and concentration of the molecules 20, 22 relative to the smart surface 10 is not necessarily true to scale; and the surface confined molecules 12 of the smart surface 10 may not visually reflect what may be observed under a microscope. Rather, the visual depiction of these molecules is intended to simplistically convey the process of separation, wherein water molecules 22 may be alternatively attracted or repelled relative to the smart surface 10 to manipulate the oil and water molecules 20, 22 within the fluid mixture. A more specific and detailed portrayal of the molecular chemistry of separation may be found in numerous other scientific and technical treatises, such as those cited herein.

Figure 3:
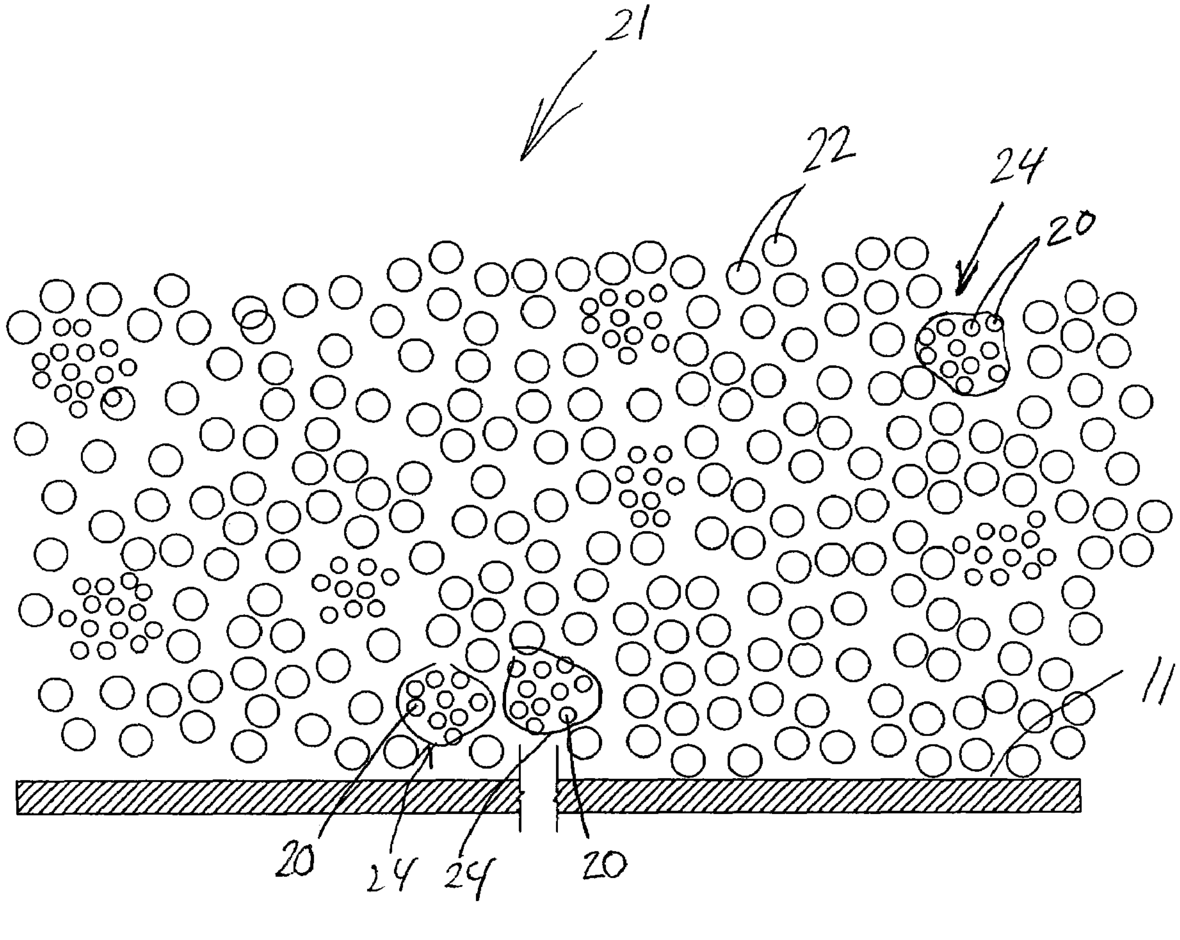
FIG. 3 conceptually illustrates aggregation of smaller oil particles or molecules into larger drops of oil within the fluid mixture after multiple voltage cycles.

The voltage may be cycled between the off position of FIG. 1 and the on position of FIG. 2. With each cycle, as the oil droplets 20 segregate, they begin to aggregate with one another into larger oil drops 24 (conceptually depicted in FIG. 3). FIG. 3 conceptually illustrates aggregation that has occurred over time of smaller oil droplets 20 into larger oil drops 26 within the fluid mixture 21, typically after multiple voltage cycles. The surface 11 in FIG. 3 may be the smart surface 10, or another surface 11 downstream from the smart surface 10.

As smart surface technology continues to develop, smart surfaces may be achieved that interact with molecules other than just water molecules. Although the smart surface 10 preferentially interacts with water, due to water's polar configuration and the smart surface's ability to undergo conformational changes affecting it's charge distribution, it is conceivable that smart surfaces may be developed whose alternating properties may comprise more than mere charge dispersement. For example, a smart surface may be developed that directly interacts with oil (a generally non-polar molecule), instead of or in addition to merely attracting and repelling water. The ability of a smart surface 10 or a combination of smart surfaces to interact with both water and oil may increase the efficacy of separation.

Figure 4:
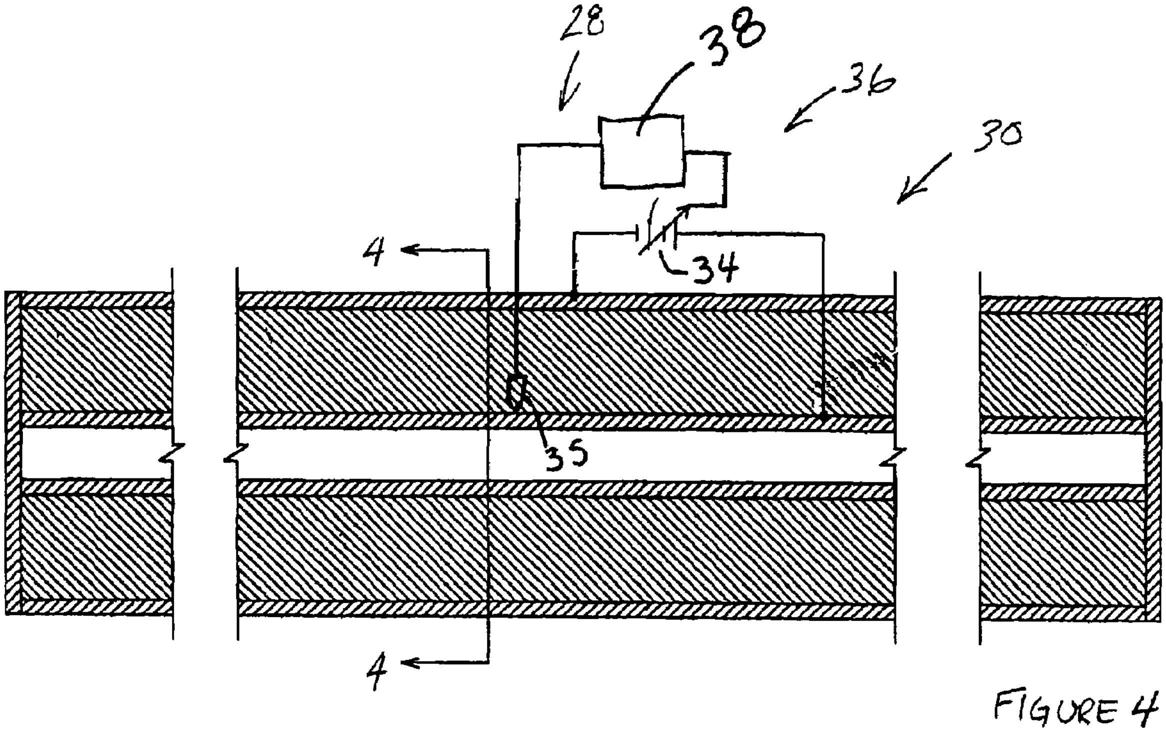
FIG. 4 conceptually illustrates a cross-sectional view of a fluid conditioning vessel having radially extending fins to which a smart surface is affixed, for use with a downstream conventional separator.
Figure 5:
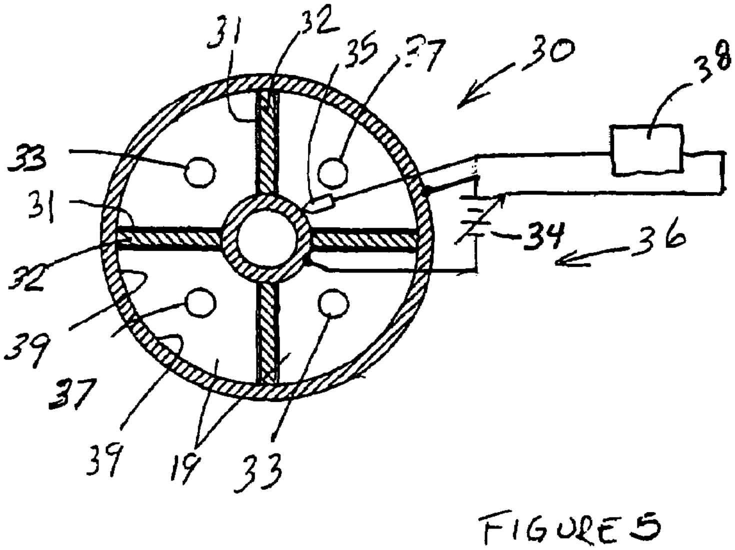
FIG. 5 illustrates a sectional view taken along the section line 4-4 of FIG. 4.

Smart surfaces may be used to separate or at least enhance separation of a fluid mixture. Many potential applications for such separation exist. These applications include both small scale and large scale manipulation of fluids. A commercially useful application on a relatively larger scale would be to enhance separation of oil and water produced from a hydrocarbon recovery well. FIG. 4 conceptually illustrates a portion of separating system generally indicated at 28. A generally circular cross-sectional view of a fluid conditioning vessel 30 is shown, having radially extending webs 32 supporting a smart surface 31. FIG. 5 illustrates a sectional view taken along the section line 4-4 of FIG. 4. An interior wall 39 of the conditioning vessel 30 has a generally circular cross-sectional shape and the plurality of webs 32 radially extend from the interior wall 39 to define flow passages 19 longitudinally extending between the fluid inlet 33 and the fluid outlet 37.

Figure 6:
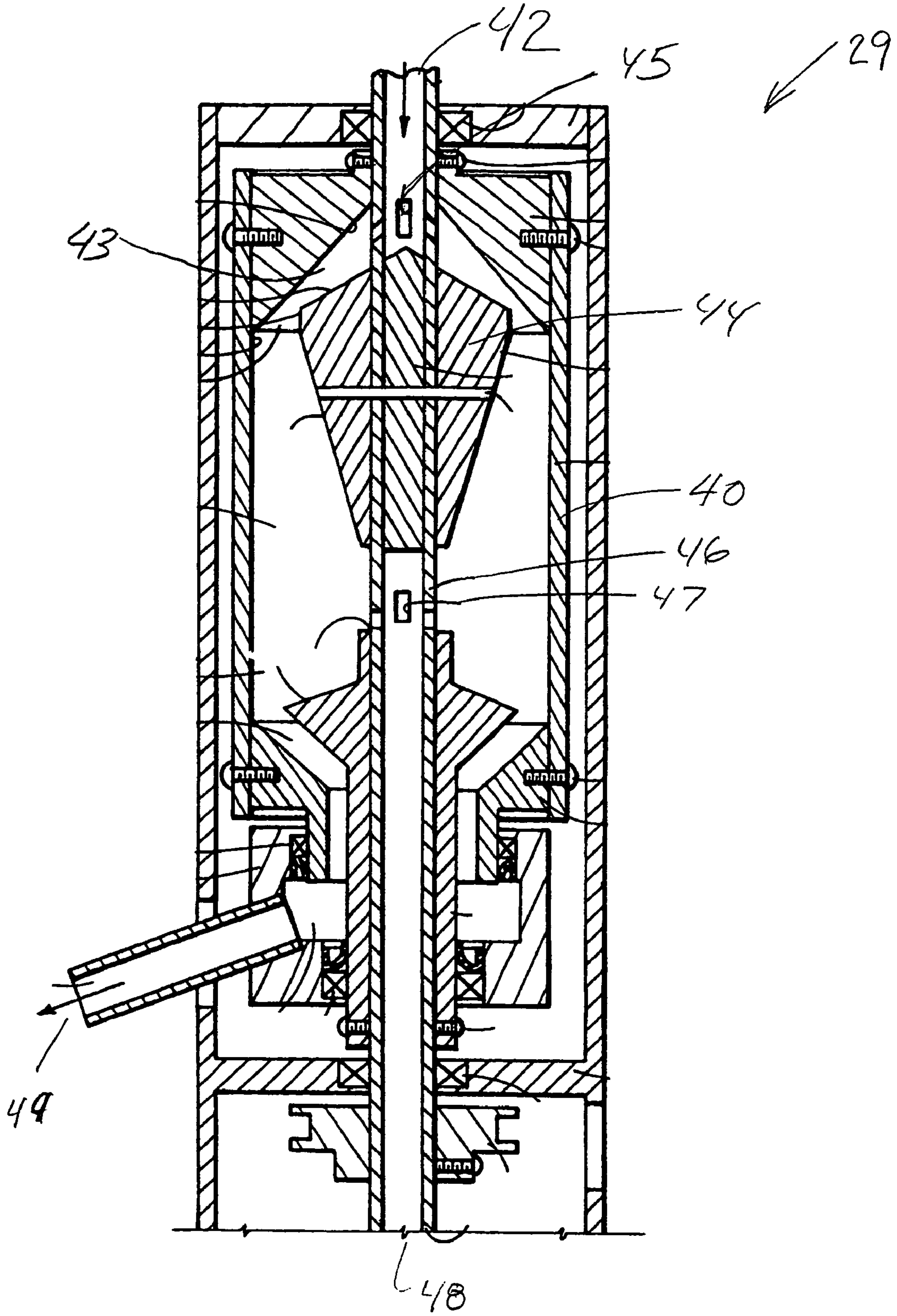
FIG. 6 illustrates a conceptual view of a conventional centrifugal separator for use downstream from the fluid conditioning vessel.

The conditioning vessel 30 of FIG. 4 may be used for conditioning fluid to enhance separation by a downstream conventional separator, such as centrifugal separator 29 shown in FIG. 6. Circuit 36 includes voltage source 34, capacitor probes 35 in contact with smart surface 31, and computer 38 in communication with the capacitor probes 35. A fluid mixture may pass into the vessel 30 through fluid inlet 33. As the fluid mixture passes between the webs 32 and over the smart surface 31, the voltage source 34 is cycled, segregating the oil and water and producing larger oil drops, as discussed in connection with FIGS. 1-3. A U-tube (not shown) at the end of the vessel 30 may fluidly connect inlet tube 33 with outlet tube 37. The conditioned fluid mixture is then passed out of the vessel 30 through fluid outlet 37 and to the downstream conventional separator 29.

The downstream conventional centrifugal separator 29 includes a rotating separator vessel 40, which receives the conditioned fluid mixture via inlet tube 42. Fluid mixture enters separation cavity 43 through port 45. Separator vessel 40, inlet tube 42, flow wedge 44, central tube 46, and oil outlet tube 48 rotate together. Due to this rotation, heavier fluid components, such as water, migrate outwardly and exit through radially outward water outlet 49. Lighter weight fluid components, such as oil, migrate inwardly, passing through port 47 and exiting through radially inward oil outlet tube 48.

It is well know that in this type of conventional centrifugal separator, larger oil droplets separate more quickly and efficiently than smaller oil droplets. The conditioning vessel 30 thus "conditions" fluid by increasing the size of the droplets prior to reaching the conventional separator 29. This enhanced separation can reduce energy costs and increase the degree of separation and purity of components exiting through the water and oil outlets 49, 48.

Figure 7:
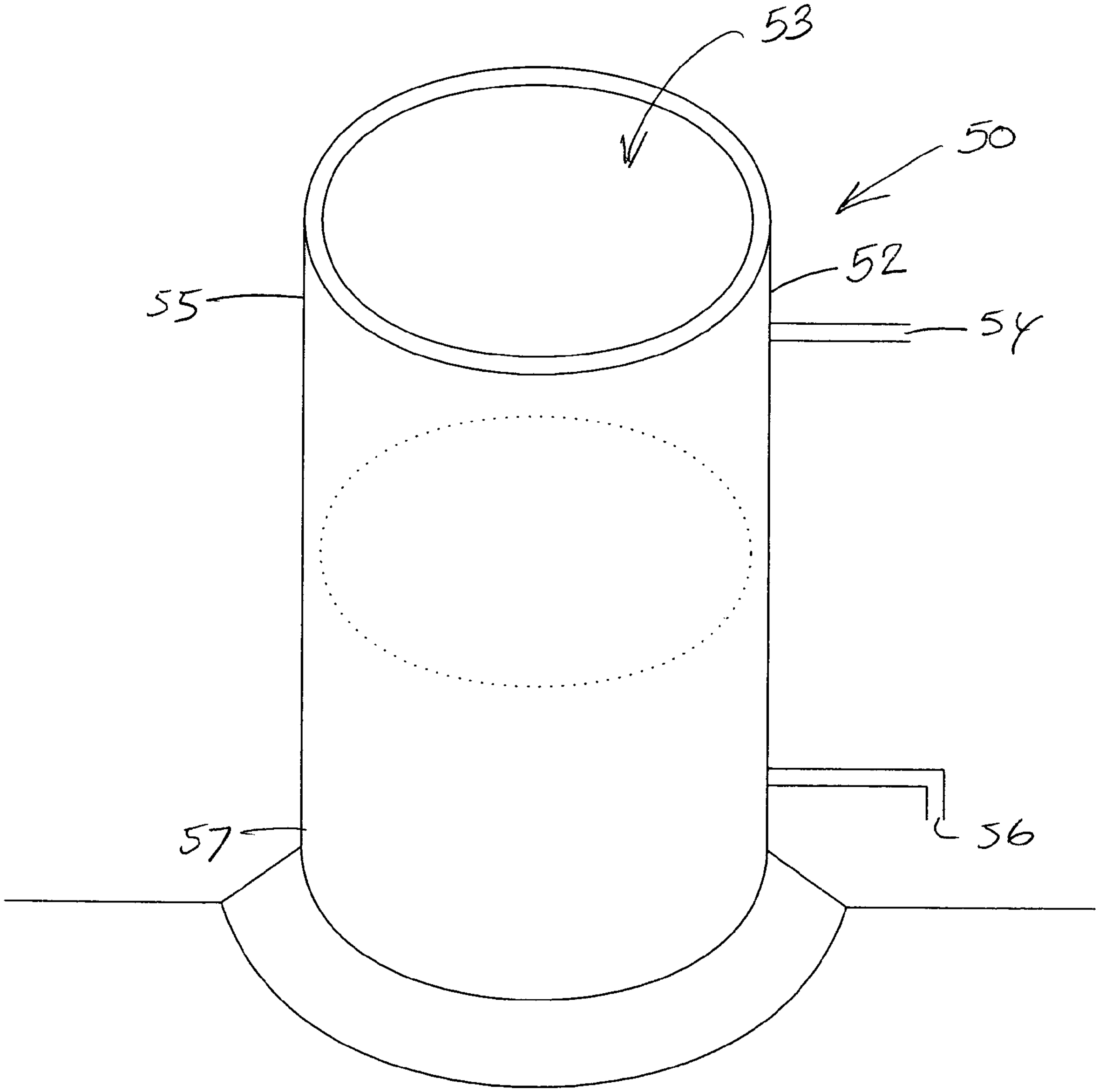
FIG. 7 illustrates a conceptual view of a conventional gravitation separator for use downstream from the fluid conditioning vessel.

Larger oil droplets also increase the ease of separation in other conventional separators, such as hydrocyclonic and gravitational separators. These other types of conventional separators may therefore also be used downstream from the conditioning vessel 30. FIG. 7 conceptually illustrates a conventional gravitational separator 50. Fluid mixture may be delivered from conditioner 30 to vessel 52, such as through an upper opening 53. Vessel 52 contains the fluid mixture while the lighter weight oil segregates upward and the heavier water segregates downward. An oil outlet 54 is positioned on an upper end 55 of the separator vessel 52 for outputting the separated oil. A water outlet 56 is positioned below the oil outlet 54 at a lower end 57, for outputting the separated water.

Figure 10:
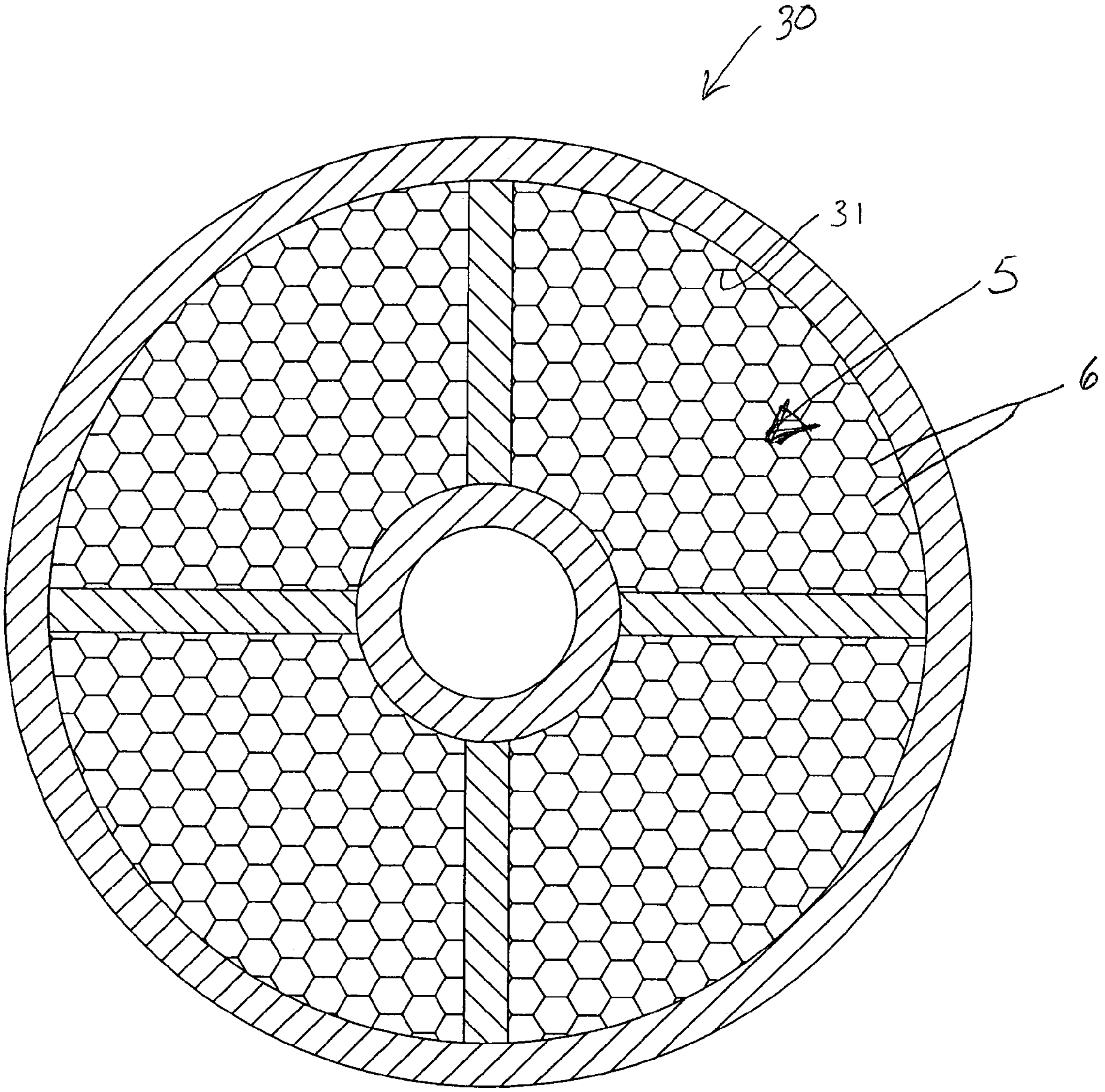
FIG. 10 conceptually illustrates a cross-sectional view of an alternative embodiment of a vessel containing a mesh of tubular cells to which the smart surface is affixed and through which the fluid mixture may flow.

Referring back to FIGS. 4 and 5, the webs 32 provide increased surface area for supporting smart surface 31, to increase efficacy of fluid conditioning. As an alternative to webs 32, FIG. 10 shows an alternative embodiment of conditioning vessel 30 having a mesh 5 for supporting the smart surface 31. The mesh 5 comprises individual tubular cells 6 longitudinally arranged with respect to the vessel 30. The fluid mixture is flowable through the mesh 5 by flowing through cells 6. The webs 32, like mesh 5, serve the purpose of increasing the surface area for supporting the smart surface 31, to increase efficacy of fluid conditioning. Other arrangements of surfaces within vessel 30 may be chosen to increase surface area.

Capacitor probes 35 measure capacitance at the smart surface 31. Computer 38 evaluates changing capacitance at the smart surface 31. As oil accumulates on the smart surface 31, capacitance at the smart surface 31 varies with the thickness of this layer of oil. The capacitor probe 35 is therefore useful for evaluating by inference how much oil has accumulated on the smart surface 31. The computer 38 may then control the voltage source 34 to affect the smart surface 31. The computer 38 may, for example, signal the voltage source 34 to cycle the voltage to alternately attract and repel the water at a frequency functionally related to the measured capacitance. Because increasing oil accumulation corresponds with increasing capacitance, the computer may decrease the frequency in response to increasing capacitance. This is useful, for example, to optimize the power consumption by the conditioner 30. In some embodiments, for example, if capacitance is too low, signaling a relatively small deposit of oil on the smart surface 31, the computer 38 may selectively decrease the frequency of the applied voltage, allowing more time for oil to accumulate before the surface is switched to release the accumulated oil. If capacitance is too high, possibly signaling a "saturated" state with a maximum amount of oil deposited on the smart surface 31, the computer 38 may increase the frequency to keep up with the higher concentration of oil. In a more sophisticated system 28, the computer 38 may evaluate a rate of change of capacitance. The rate of change would provide further indication of how fast oil is accumulating, and the computer 38 could respond by adjusting the voltage frequency in response.

Figure 8:
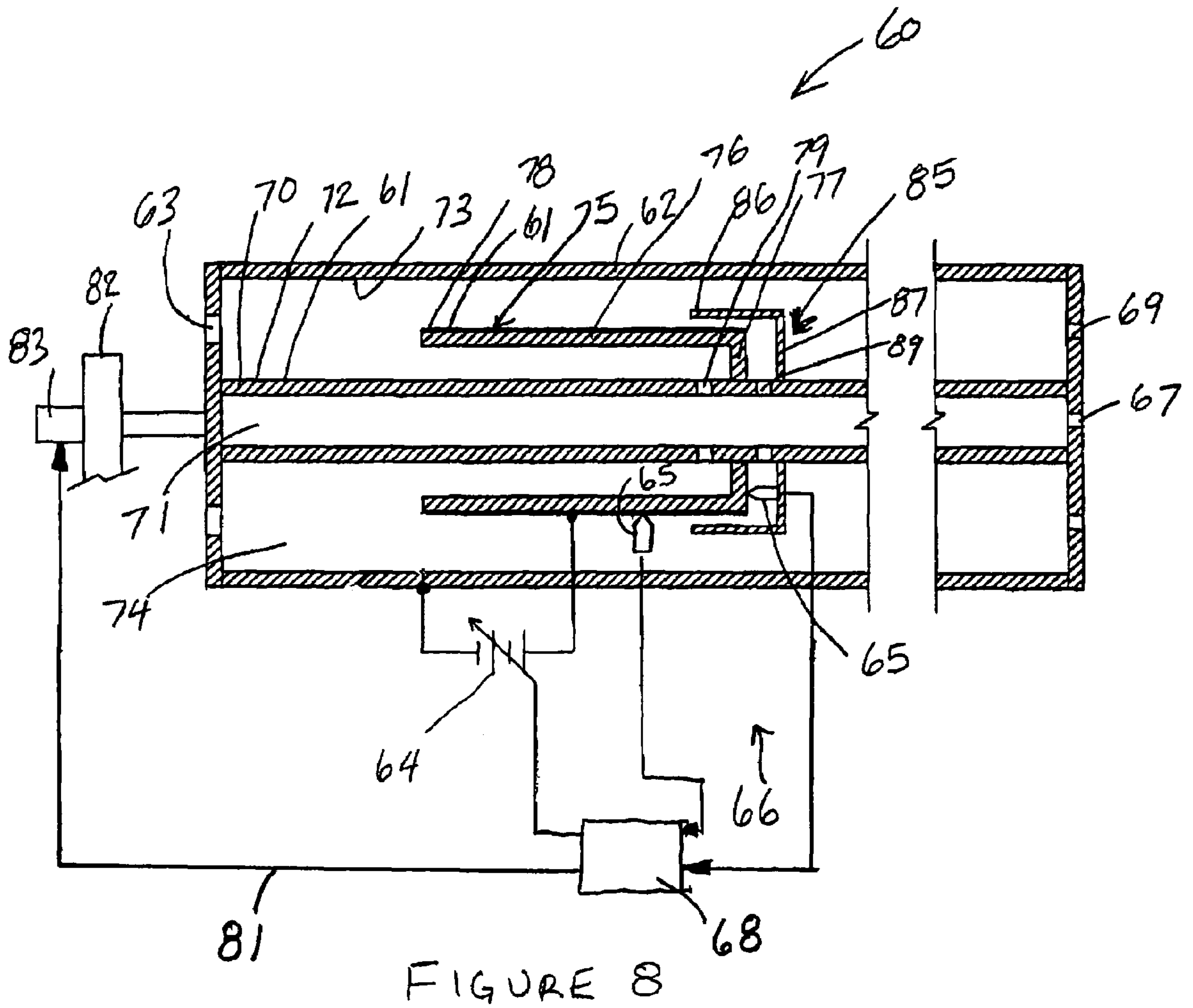
FIG. 8 conceptually illustrates a centrifugal separator having a smart surface for assisting centrifugal separation.

In other embodiments, smart surfaces could be employed directly within an otherwise conventional fluid separator. FIG. 8 conceptually shows a centrifugal separator 60 containing a smart surface 61. A separator vessel 62 analogous to vessel 40 of the conventional centrifugal separator (FIG. 6) has a fluid inlet 63 for passing fluid mixture into the separator vessel 62, a radially inward oil outlet 67 for passing lighter weight separated oil out of the separator vessel 62, and a radially outward water outlet 69 for passing heavier separated water out of the separator vessel 62. The separator vessel is rotated by motor 82. The oil and water outlets 67, 69 are positioned downstream from the fluid inlet 63. Smart surface 61 is within the separator vessel, connected within circuit 66 to voltage source 64 for selectively applying a voltage to the smart surface 61 to selectively attract or repel the water in proximity to the smart surface 61, thereby displacing the oil in proximity to the smart surface 61 away from or toward the smart surface 61, respectively. The centrifugal separator 60 is rotatable about an axis of rotation, whereby the higher density water segregates radially outward while the lower density oil segregates radially inward.

An inner sleeve 70 within the separator vessel 60 has an inner flow passage 71 and an outer surface 72 radially inward of an interior wall 73 of the separator vessel 60 to define an annular flow passage 74 between the outer surface 72 of the inner sleeve 70 and the interior wall 73 of the separator vessel 60. A first annular flow vane 75 within the annular flow passage 74 is secured to the inner sleeve 70. The first annular flow vane 75 has a longitudinally extending first intermediate sleeve 76 positioned radially outward of the inner sleeve 70 and a first radially extending flange 77 connecting the first intermediate sleeve 76 and the inner sleeve 70. An outer surface 78 of the first intermediate sleeve 76 preferably supports at least a portion of the smart surface 61, as shown, for enhancing separation of the portion of the fluid mixture passing radially outward of the first intermediate sleeve 76. The radial positioning of the first intermediate sleeve 76 is such that fluid mixture passing over it has some water in it, whereas fluid mixture radially inward of it has a higher concentration (potentially approaching 100%) of oil, and fluid mixture radially outward of it has a higher concentration (potentially approaching 100%) of water. Thus, one function of the first intermediate sleeve 76 is to enhance separation at its radially central location, where substantial quantities of both oil and water components still reside in the fluid mixture.

A first vane port is preferably placed in communication with the inner flow passage 71 of the inner sleeve 70, as shown, and is positioned on the inner sleeve 70 within the first annular flow vane 75, for passing separated oil between the inner sleeve 70 and the first intermediate sleeve 76 into the inner flow passage 71 of the inner sleeve 70. The first annular flow vane 75 thus helps guide this oil-rich area of the fluid mixture into the inner flow passage 71 and out through oil outlet 67.

A second annular flow vane 85 within the annular flow passage 74 is secured to the inner sleeve 70. The second annular flow vane 85 has a longitudinally extending second intermediate sleeve 86 radially outward of the first intermediate sleeve 76, and a second radially extending flange 87 downstream of the first radially extending flange 77 and connecting the second intermediate sleeve 85 and the inner sleeve 70. The second annular flow vane need not necessarily include a portion of the smart surface 31. Rather, a primary purpose of the second annular flow vane 85 is to help collect oil or oil-rich mixture separated from the fluid mixture adjacent the outer surface 78 of the first intermediate sleeve 76. A second vane port 89 is in communication with the inner flow passage 71 of the inner sleeve 70, and is positioned on the inner sleeve 70 within the second annular flow vane 85, for passing separated oil or oil-rich mixture between the first and second intermediate sleeves 76, 86 into the inner flow passage 71 of the inner sleeve 70.

Referring still to FIG. 8, capacitor probes 65 are included with separator 60 for measuring capacitance at the smart surface 61. Other sensors may be included (not shown), particularly to sample the oil content of the fluid exiting through port 89. A sensor measuring the oil content in the intermediate annulus that exits port 89 may not need to be as sensitive as one located to sample the oil in the outer annulus which exits through port 69, because the oil exiting port 89 is likely to be higher in concentration of oil. A computer 68 is in communication with the capacitor probes 65 and/or other oil in water sensitive probes for evaluating changing capacitance at the smart surface 61 or in the intermediate annulus that exits port 89. The computer 68 is in communication with the voltage source 64 and signals the voltage source 64 to cycle the voltage to alternately attract and repel the water at a frequency functionally related to the measured capacitance. In some embodiments, as with the embodiment of FIG. 4, the computer 68 may increase the frequency in response to increasing capacitance, indicating increased concentration of oil. The fluid separator 60 may include a controller 83 connected to motor 82 for controlling rotation of the separator vessel 60. The controller 83 is in communication with the computer 68 via control line 81 for controlling rotational speed of the separator vessel 60 as a function of the measured capacitance. In some embodiments, the controller 83 increases rotational speed of the separator vessel 60 in response to an increase in the measured capacitance, the objective being to reduce the oil content of the fluid exiting port 89, such that virtually all the oil exits the separator through port 79, and to minimize oil present in the water exiting through port 69.

Figure 9:
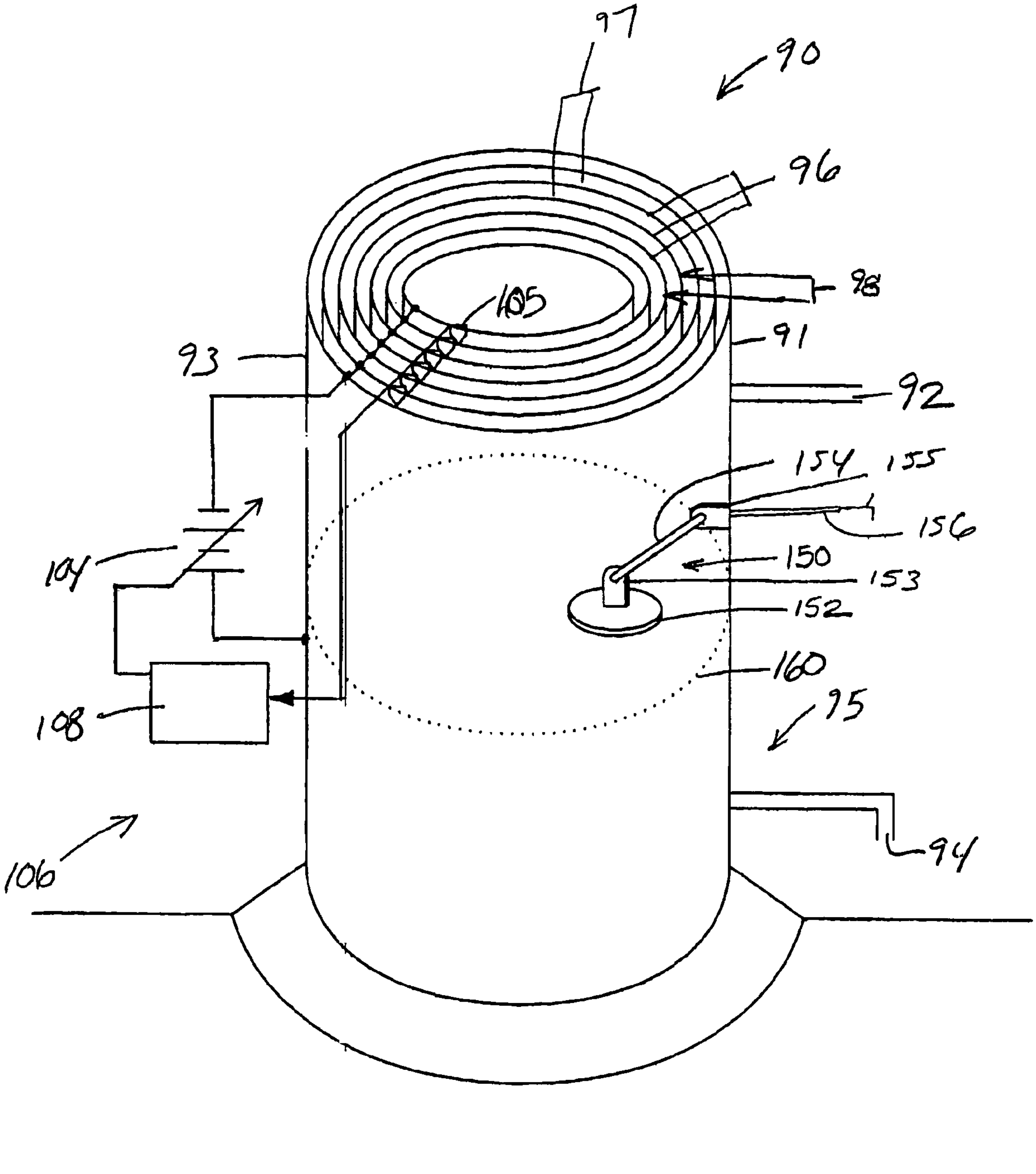
FIG. 9 conceptually illustrates a gravitational/static separator having nested annular sleeves to which a smart surface is affixed.

FIG. 9 shows another embodiment of a separator 90 having separator vessel 91 that is a gravity separator for gravitational separation, whereby the higher density water segregates downward while the lower density oil segregates upward. Oil outlet 92 is positioned on an upper end 93 of the separator vessel 91 and water outlet 94 is positioned on a lower end 95 of the separator vessel 91. Separator vessel 91 may have a generally circular cross-section. It may include a plurality of webs, like webs 32 (FIGS. 4 and 5), or a mesh, like mesh 5 (FIG. 10). Instead, however, the separator vessel 91 preferably has a plurality of longitudinally extending, nested annular sleeves 96 defining annular flow passages 97 therebetween for infiltrating with the fluid mixture. The smart surface 98 is supported on the annular sleeves 96. This arrangement and positioning of the annular sleeves 96 provides a great deal of surface area for supporting the smart surface 98, and relatively narrow thickness of fluid mixture between flow passages 97, to maximize efficacy of separation.

As in other embodiments, a circuit 105 of the separator 90 includes capacitor probes 105 for measuring capacitance at the smart surface 98, and a computer 108 in communication with the capacitor probes 105 for evaluating changing capacitance at the smart surface 98. The computer 108 is in communication with the voltage source 104 and signals the voltage source 104 to cycle the voltage to alternately attract and repel the water at a frequency functionally related to the measured capacitance. In some embodiments, the computer 108 increases the frequency in response to increasing capacitance, which is indicative of increasing deposits of oil on the smart surface 98.

The gravity separator 90 may also have a separate sensor 150 located within the separator vessel 91 that, via computer 108 controlling the time intervals at which water is removed, maintains a constant oil/water contact level in the container to ensure that only water exits through outlet 94. Because of the separation due to their different densities, oil essentially floats on water, and oil and water will contact one another at an interface depicted by dashed line 160. The level of this interface 160 will rise or fall as oil and water are drawn out through their respective outlets 92, 94 at different rates. If water is removed faster than oil, the interface 160 will move downward with respect to vessel 91. If oil is removed faster than water, the interface 160 will rise. It is therefore advantageous to control the level of interface 160 to ensure that only nearly pure water exits through outlet 94 and nearly pure oil exits through outlet 92. Sensor 150 conceptually depicts a float-type sensor known in the art that may be used for this purpose. A float 152 may be denser than oil but lighter than water, so that it floats at or near the level of the oil/water interface 160. A rod 154 may be hingedly to float 152 at hinges 153 and 155. A circuit within the sensor 150 senses movement and/or positioning of the rod 154 to compute the level of interface 160. The sensor 150 is in communication with computer 108, such as via signal wire 156. The computer 108 may adjust flow rates through either or both of the outlets 92 and 94 to keep the level of the interface 160 within a range that ensures relatively pure water exits outlet 94 and relatively pure oil exits outlet 92.

Figure 11:
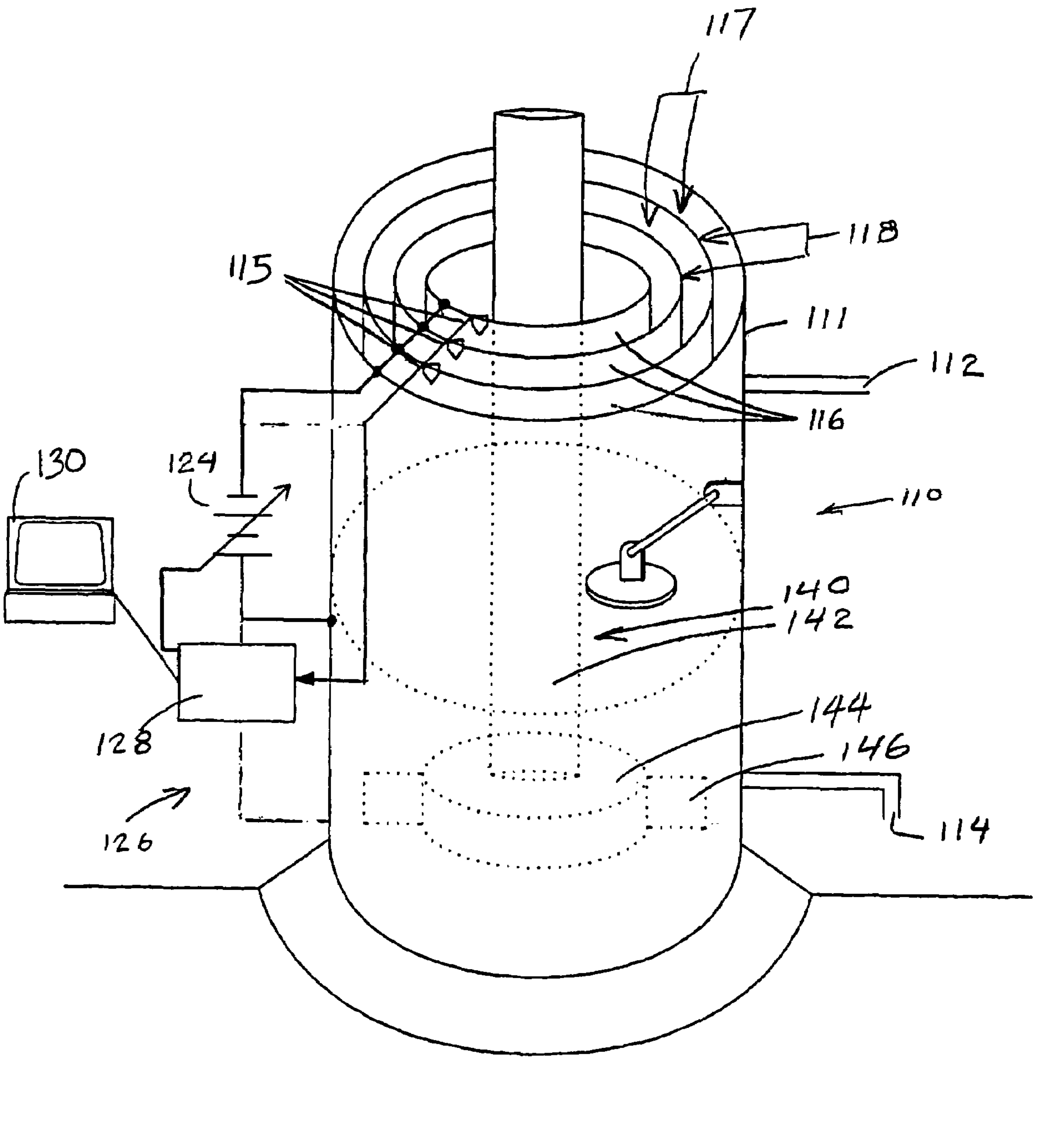
FIG. 11 conceptually illustrates a concentration sensor employing smart surfaces.

A related aspect of the invention provides a novel way to measure concentration of certain fluids within a vessel, even in applications not involving separation of fluids. For example, the concentration of water and one or more other substances such as oil in a fluid mixture may be detected. A number of concentration sensors using prior art technologies are commercially available. FIG. 11, by contrast, conceptually shows one embodiment of a concentration sensor 110 according to the invention. Vessel 111 has ports 112, 114, which may be used as fluid inlets and/or outlets, but because fluid separation is not the focus of this embodiment, ports 112, 114 need not necessarily serve the same function as oil and gas outlets for separators previously discussed. A smart surface 118 is secured within the vessel 111, preferably to the nested annular sleeves 116 as shown, which define annular flow passages 117 therebetween. A circuit 126 includes a voltage source 128 for selectively applying a voltage to the smart surface 118, a plurality of capacitor probe 115 for measuring capacitance at a plurality of locations on the smart surface 118, and a computer 128 in communication with the capacitor probes 115 for evaluating changing capacitance at the smart surface 118. Applying a voltage at the smart surface 118 repels water and displaces oil toward the smart surface 118, as discussed previously. After turning on the circuit 126, oil will begin to accumulate on the smart surface 118, and capacitance will increase, as also discussed above. The computer 128 outputs representations of concentration of any of the water and the one or more other substances as a function of the measured capacitance. The computer also has the capacity to control the voltage source 124, if necessary.

The output representations of concentration may be numerical or graphical data, such as may be displayed on a computer monitor 130. A conventional concentration sensor may be used to calibrate the concentration sensor 110, such as by measuring and recording a data set that includes concentration and capacitance parameters. The data set may be stored in and referenced by computer 128. After calibration is complete, the constituents of the fluid mixture may be analyzed in terms of concentration by referencing the data set, and possibly interpolating or extrapolating between values stored in the data set. The capacitor probes 115 may sense capacitance at the plurality of locations along the smart surface 118, and compare the measured capacitance at each of the plurality of locations, such as to give a weighted average of concentration, or to provide redundant measure of capacitance to increase reliability of the reported capacitance.

A number of factors may affect the accuracy of the concentration sensor 110. For example, the fluid mixture may not be evenly mixed when it is first put in the vessel 111. Also, the fluid mixture will become segregated over time, as discussed previously. To return the fluid mixture to an evenly dispersed state, an agitator 140 conceptually shown in FIG. 11 may be included. The agitator 140 is selectively movable within the fluid vessel 111 for mixing the fluid mixture. A shaft 142 is rotated by a drive motor or other means, which rotates a mixer element 144 to which fins 146 are secured. The rotating fins 146 move the fluid mixture.

Although fluid separation according to the invention is potentially more efficient and effective than existing separation techniques, it is a practical reality that fluid exiting the oil and water outlets discussed herein is not necessarily 100% pure. In many practical situations, fluid exiting an oil outlet has a high concentration of oil and an appreciable amount of water, and fluid exiting a water port typically has a high concentration of water and a very small amount of oil. In practice, further processing may be performed to further separate and purify the partially separated constituents. For example, fluid exiting a water port and containing traces of oil may be passed again through one or more separator cycles to further separate out remaining oil.

In fact, smart surface separation is likely to be more effective for fluid mixtures containing a proportionately small amount of oil. Fluid mixtures with high concentrations of oil may be relatively unresponsive to the action of the smart surface, whereas fluid mixtures with small concentrations of oil may be more responsive to the smart surface. This is a highly useful aspect of the invention when applied to the environmental and regulatory problem of purifying water for reinjection into a well. Existing separation techniques may do a good job of separating out the majority of oil, while being less effective or essentially ineffective in purifying fluid mixtures having only a small concentration of oil. In part, this is because a low oil concentration generally correlates with small oil particle size, which as previously discussed makes separation difficult. Smart surfaces as will be used in the invention increase particle size, thereby enhancing separation. Thus, smart surface technology may be used to attain a level of purity not achieved with prior art separation techniques. In some embodiments, therefore, fluid will be first separated with a conventional fluid separator (gravitational, centrifugal, etc.), and only subsequently passed through a smart surface fluid conditioner as in FIGS. 4 and 5 or smart surface separator as in FIGS. 8 and 9.

Although fluid separation may be useful in countless industrial, scientific, and engineering applications, the fluid separator embodiments shown in FIGS. 4-10 have particular potential in a variety of oil and gas production arenas, such as in land based or offshore well production. Gravitational and centrifugal separators may be either above or below ground, depending on the design. Likewise, conditioning vessels according to this invention, such as the embodiment of vessel 30, may also be positioned in a variety of locations, either above or below ground. In some embodiments, for example, a method of separation may involve producing crude oil from a formation through a conventional subsea or onshore well, then passing the crude oil through one or more separation cycles in an above-ground gravitational separator like the one shown in FIG. 9. In other embodiments, a method of separation may involve positioning a centrifugal or hydrocyclonic separator downhole within an onshore well, so that water can be reinjected into the formation without the unnecessary step of first bringing it to the surface.

Concentration sensors such as sensor 110 also have a number of applications in various industries. The concentration sensors may in practice be large, such as might be used in conjunction with an oil and water separator, or tiny, such as may be used to measure minute concentrations of fluid components in a laboratory fluid sample. In some applications, concentration sensors might be used primarily to sense concentration, such as for scientific observation of fluid mixtures. In other applications, concentration sensors may instead be viewed as merely a subsystem of a separator or other apparatus. For example, comparing the concentration sensor 110 of FIG. 11 and the gravitational separator 90 of FIG. 9, the concentration sensor 110 is essentially an isolated subsystem of separator 90. The separator 90 senses concentration using the same essential elements of sensor 110, and it further responds to measured concentration to control the separation of fluids.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations, and modifications, including but not limited to those design alternatives specifically discussed herein, may be made in the practice of the invention without departing from its scope.

The invention claimed is:

1. A method of separating a fluid mixture of water and oil, the water having a higher density than the oil, the method comprising:

providing a separator vessel for containing the fluid mixture, the vessel including a fluid inlet, an oil outlet, and a water outlet;

a smart surface upstream of the oil outlet and the water outlet, the smart surface having a plurality of surface-confined molecules sufficiently spaced to undergo conformational transitions in response to an applied voltage to preferentially expose hydrophilic or hydrophobic portions of the surface-confined molecules;

providing a voltage source for selectively applying a voltage to the smart surface;

selectively applying a voltage to the smart surface to alternately attract and repel the water in proximity to the smart surface, thereby displacing the oil in proximity to the smart surface away form or toward the smart surface, respectively;

passing the fluid mixture through the fluid inlet and into the separator vessel to at least partially separate the oil and water; and passing separated oil through the oil outlet, and passing separated water through the water outlet.

2. A method as defined in claim 1, wherein the separator vessel houses the smart surface.

3. A method as defined in claim 1, wherein a vessel housing the smart surface is structurally separate for the separator vessel.

4. A method as defined in claim 1, wherein the separator vessel is a gravity separator for gravitational separation, whereby the higher density water segregates downward while the lower density oil segregates upward, and the oil outlet is positioned on an upper end of the separator and the water outlet is positioned on a lower end of the separator.

5. A method as defined in claim 1, further comprising:

providing a capacitor probe for measuring capacitance at the smart surface; and evaluating changing capacitance at the smart surface.

6. A method as defined in claim 5, further comprising:

signaling the voltage source to cycle the voltage to alternately attract and repel the water at a frequency functionally related to the measured capacitance.

7. A fluid separator as defined in claim 6, further comprising:

increasing the frequency in response to increasing capacitance.

8. A method as defined in claim 6, further comprising:

the separator being a centrifugal separator; and controlling rotational speed of the separator vessel as a function of the measured capacitance.

9. A method as defined in claim 8, further comprising:

increasing rotational speed of the separator vessel in response to an increase in the measured capacitance.

10. A method as defined in claim 1, further comprising:

positioning the separator vessel downhole in a well;

positioning the smart surface downhole within the well; and passing the fluid mixture from the well into the separator vessel to separate the fluid mixture downhole.

11. A method as defined in claim 10, wherein the separator vessel further comprises:

a centrifugal or hydrocyclonic separator vessel.

12. A method as defined in claim 10, further comprising:

injecting the separated water into a formation.

* * * * *